Jan. 5, 1954  P. J. DANCIK  2,664,958
THROTTLE CONTROL AND PITCH SYNCHRONIZING DEVICE
Filed Feb. 23, 1951  2 Sheets-Sheet 1

INVENTOR
Paul J. Dancik

Jan. 5, 1954  P. J. DANCIK  2,664,958
THROTTLE CONTROL AND PITCH SYNCHRONIZING DEVICE
Filed Feb. 23, 1951  2 Sheets-Sheet 2

INVENTOR.
PAUL J. DANCIK
BY Edward G. Vanderleh
Agent

Patented Jan. 5, 1954

2,664,958

UNITED STATES PATENT OFFICE 2,664,958

THROTTLE CONTROL AND PITCH SYNCHRONIZING DEVICE

Paul J. Dancik, Media, Pa., assignor to Piasecki Helicopter Corporation, Morton, Pa.

Application February 23, 1951, Serial No. 212,335

2 Claims. (Cl. 170—135.74)

This invention relates in general to helicopters and in particular to an automatic throttle-collective pitch synchronizing device. These helicopters are controlled in speed and direction by changing the angle of attack of the several rotor blades either simultaneously or cyclically throughout all or part of the circular path described by the blades. Control of the helicopter along its vertical axis is primarily provided by the collective pitch setting of the blades. As used herein "collective pitch" denotes the average angle of attack of all blades of one rotor at any instant.

The usual procedure in a helicopter take-off is to bring the rotor up to a predetermined speed by opening the throttle of the engine an amount sufficient to overcome the transmission losses and profile drag of the blades. This requires a throttle opening of approximately 9 or 10 degrees. The collective pitch lever is then gradually displaced, developing an inflow of air through the rotor disc. After the inflow of air becomes stable, additional pitch angle of the rotor blades causes the helicopter to rise. The pitch angle required depends on atmospheric conditions and gross weight. This being a fixed relation, it is possible to interconnect the collective pitch mechanism and the throttle by an automatic throttle-collective pitch mechanism comprising suitable cams or linkages.

Past design and construction of throttle-collective pitch synchronizing devices has been based on arbitrary values for atmospheric conditions, transmission losses, and gross weight. This resulted in a device which accurately synchronized the throttle setting of the engine with the pitch setting of the rotor blades only when actual values corresponded with the arbitrary values selected. Any deviations of the actual from the arbitrary values altered the synchronization or rate of change of the throttle setting with respect to changes of pitch setting of the blades and required a correction of throttle setting.

The principal object of this invention is to provide a throttle collective pitch synchronizing control means which delivers the correct amount of power throughout the entire movement of the collective pitch lever and under varying atmospheric and loading conditions.

Another object of this invention is to provide an automatic throttle-pitch synchronizing device wherein the throttle setting of said device for any given flight condition at constant atmospheric and loading conditions will vary as a function of the pitch setting of the rotor blades and wherein initial changes in atmospheric conditions and gross weight loadings will not alter the rate of change of the throttle with respect to the pitch setting of said blades upon actuation of the collective pitch lever.

Another object of this invention is to provide an automatic throttle-pitch synchronizing device wherein the throttle setting of said device for any given flight condition at constant atmospheric and loading conditions will vary as a function of the pitch setting of the rotor blades and wherein initial changes in atmospheric conditions and gross weight loadings will not alter the rate of change of the throttle with respect to the pitch setting of said blades upon actuation of the collective pitch lever.

Other objects and advantages will be more particularly pointed out hereinafter or will become apparent as the description proceeds.

In the accompanying drawings there is illustrated a suitable mechanical embodiment for the purpose of disclosing the invention and the drawings are for the purpose of illustration only and are not to be taken as limiting the invention.

Figure 3:
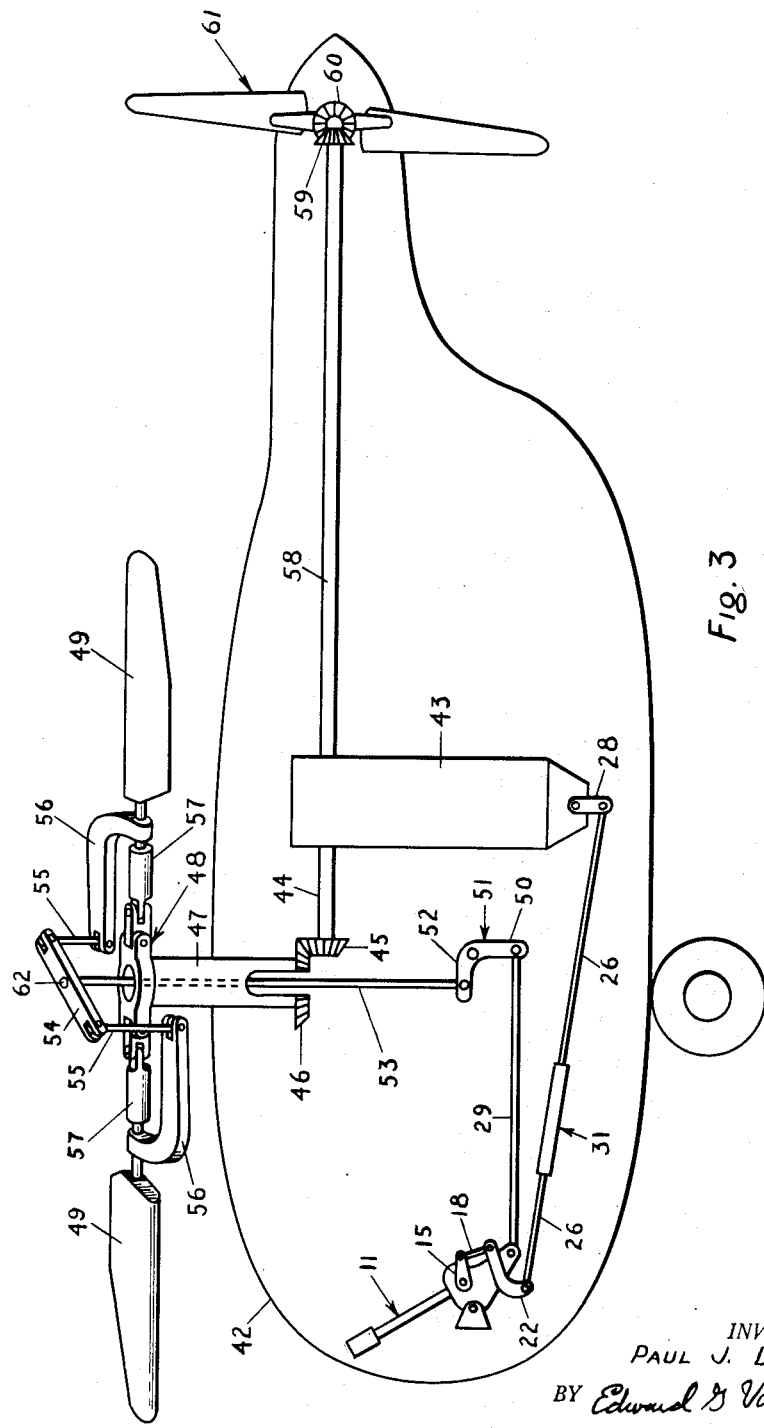
Figure 3 shows a schematic general arrangement view in side elevation of a helicopter embodying the invention.

In Figure 3 the helicopter has a fuselage 42 enclosing an engine 43 from which a transmission shaft 44 is taken to reduction gears 45, 46. An upright shaft 47 transmits the engine power from the reduction gears to the lifting rotor hub 48 carrying rotor blades 49. From the rear of the engine 43 a second transmission shaft 58 is taken to gears 59, 60 which drive auxiliary rotor 61.

Displacement of collective pitch lever 11 operates a linkage comprising a connecting link 29 secured at one end to said control column 11 and at its other end to vertical arm 50 of bell crank 51. Connecting link 53 is secured at its lower end to horizontal arm 52 of said bell crank and has horizontally disposed cross bar 54 rotatively secured to its top as at 62. Links 55 are secured at each end of cross bar 54 and connect pitch horns 56 of blades 49. Each blade 49 is adapted to rotate about its longitudinal axis by virtue of pitch bearings secured within housing 57 interposed between hub 48 and blade 49. To increase the collective pitch of the blades the collective pitch lever 11 is moved rearwardly which operates the aforementioned linkage to raise the pitch horns 56 to rotate the blade about its longitudinal axis and conversely forward motion of collective pitch lever 11 operates to depress the pitch horns 56 to decrease the pitch setting of the blades.

Figure 1:
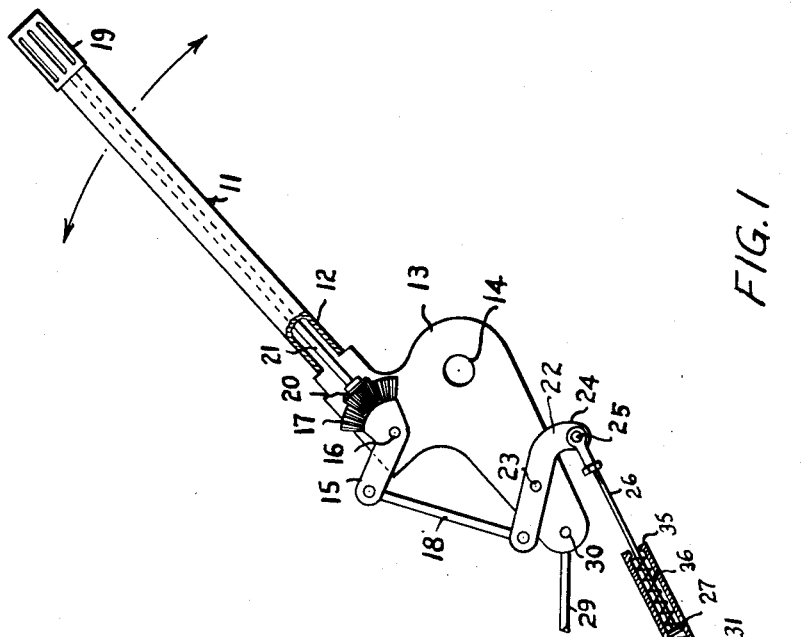
Figure 1 is a side elevational view of the automatic throttle-pitch control synchronizing device shown partly in section.

Referring to Figure 1 in detail there is shown a collective pitch lever 11 comprising a cylindrical housing 12 rigidly fixed to crank-like plate 13. Lever 11 is pivotally mounted to travel about pivot 14 which is offset a distance from the axis of cylindrical housing 12. A bell crank 15 is pivotally mounted on plate 13 by pivot 16 adjacent the lower end of cylindrical housing 12. One arm of crank 15 has integral therewith a gear segment 17 and the other arm of said crank is pin connected to link 18.

Rotatively mounted at the upper end of cylindrical housing 11 is a handle bar or throttle grip 19. Shaft 21 is integrally fixed to throttle grip 19 and encased within cylindrical housing 12. A pinion 20 is affixed to the lower end of shaft 21 and mates with the toothed gear segment 17 of crank 15. Rotative movement of twist grip 19 is conveyed to pinion 20 which in turn actuates crank 15 about its pivot 16. A floating crank 22 is pivotally mounted beneath crank 15 on plate 13 by pivot 23. One arm of said crank is pin connected to the lower end of link 18 and the other arm is pin connected at 25 to link 26. Crank 22 is bent at right angles to the main axis of said crank adjacent the pin connection 25. The lower end of link 26 has an enlarged head 27 which is slidably housed within cylindrical tube 32 of an override tube assembly 31. Tube 32 is rigidly affixed to link 33 by rivet 34 as shown. The opposite end of tube 32 is flanged inwardly at 35 and constitutes a shoulder for restraining one end of a spring 36 which is held captive within tube 32. Spring 36 encircles the shaft of link 26 and its other end abuts one surface of the enlarged head 27 of link 26. A second spring 37 is also housed within tube 32 and one of its ends abuts a second surface of head 27, the other end of said spring abutting the enlarged end 38 of link 33. The lower end of link 33 is connected to throttle lever 28 by pin connection 44. The springs are preloaded to provide an amount of override in the mechanism to permit functioning as follows:

Radial movement of throttle lever 28 is produced by actuation of throttle grip 19 and secondly by the displacement of collective pitch lever 11. The extent of radial motion which can be induced in throttle lever 28 by the throttle grip 19, plus the extent of radial motion which can be induced in said throttle by the collective pitch lever 11 exceeds the total available travel of said throttle lever 28. The "closed" limiting stop of lever 28 is indicated by numeral 42 and the "open" limiting stop by 43. Spring 37 is so loaded that a deflection of said spring occurs upon movement of the collective pitch lever to the "open" limiting position of throttle lever 28. In the same way spring 36 is so loaded that upon reverse movement of collective pitch lever 11 to the "closed" limiting position of lever 28, spring 36 will deflect to permit override of link 26.

Crank plate 13 is elongated to include a tip portion which has mounted thereon a rod 29 which is connected to a conventional collective pitch control mechanism as before described.

Figure 2:
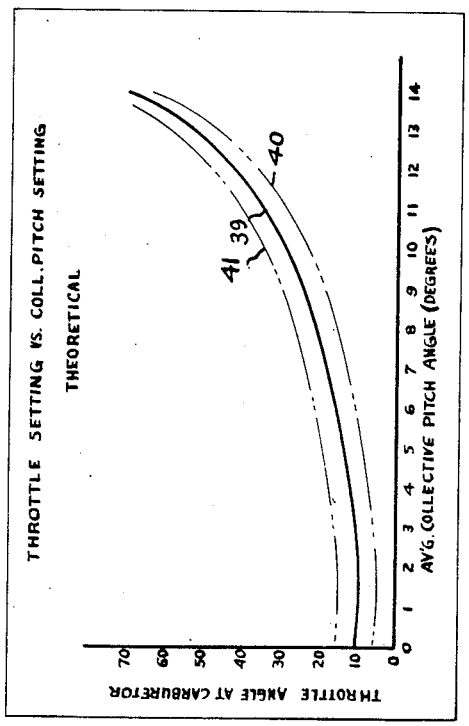
Figure 2 represents a graph showing the performance characteristics of this mechanism.

Referring to Figure 2 of the drawing, a series of curves are shown which illustrate the various angular throttle settings dictated by corresponding collective pitch settings of the rotor blades. The curve indicated by numeral 39 represents a synchronization curve which is obtained by holding constant values for atmospheric conditions, transmission losses, and gross weight loading of the helicopter and plotting the throttle settings against the pitch settings. The power required and hence throttle settings under these constant conditions to turn the rotor varies with the pitch setting of the rotor blades.

Different atmospheric conditions and gross weight loadings of the helicopter dictate different initial throttle settings. Thus the throttle setting for a take-off under temperatures of zero degrees Fahrenheit would differ materially from the throttle setting required at a take-off at 100° Fahrenheit; likewise the throttle setting for a take-off with a gross weight loading of the helicopter of 6,000 lbs. would differ from the throttle setting required for a take-off with a gross weight loading of 8,000 lbs. Under flight conditions wherein values for atmospheric conditions, transmission losses and gross weight loads are encountered which are different from those used in the determination of basic curve 39 it becomes desirable to have a device which can compensate for said differences without altering the rate of synchronization as indicated by the basic curve 39. Curves 40 and 41 represent synchronization curves wherein the initial throttle settings deviate from the initial throttle setting of basic synchronization curve 39 but follow the basic synchronization curve throughout the entire range of the throttle-collective pitch mechanism. To obtain a curve as indicated by numeral 41, for example, the pilot without displacing collective pitch lever 11 twists throttle grip 19 until the desired initial setting is obtained. Throttle grip 19, acting through shaft 21, pinion gear 20, cranks 15, 22, and related linkages, actuates throttle lever 28 to bring the rotor up to a predetermined operating speed. The collective pitch lever or control means 19 is then gradually displaced to simultaneously apply throttle and collective pitch changes to correspond with the relationship defined by curve 39.

While the preferred embodiment of the invention has been shown and described, it will be apparent that the invention can be embodied in other forms and the scope therefore should be limited only by the scope of the claims appended hereto.

I claim:

1. In an aircraft having a rotor, a power plant for driving said rotor, a throttle for said power plant, means connected with said rotor for varying the pitch of said rotor, pilot operated control means connected to said throttle, and said pitch varying means wherein movement of said means simultaneously changes the setting of said throttle and the pitch setting of said rotor, said pilot operated means comprising a lever pivotally mounted to fuselage structure, one extremity of said lever being connected to said pitch varying means, a walking beam pivotally mounted on said lever, means connecting one extremity of said walking beam to said throttle, and manually operated means mounted on said lever and connected to the other extremity of said walking beam to vary the setting of said throttle independently of motion of said lever.

2. In an aircraft having a rotor, a power plant for driving said rotor, a throttle for said power plant, means connected with said rotor for varying the pitch of said rotor, pilot operated control means connected to said throttle and to said pitch varying means wherein movement of said means simultaneously changes the setting of said throttle and the pitch setting of said rotor, said pilot operated means comprising a lever pivotally mounted to fuselage structure, one extremity of said lever being connected to said pitch varying means, a walking beam pivotally mounted on said lever, means connecting one extremity of said walking beam to said throttle, and manually operated means mounted on said lever and connected to the other extremity of said walking beam to vary the setting of said throttle independently of motion of said lever, said one extremity of the walking beam that is connected to said throttle being movable through a first arc upon movement of said lever and movable through a second arc to intersect said first arc at right angles upon actuation of said manually operated means.

PAUL J. DANCIK.

References Cited in the file of this patent

UNITED STATES PATENTS

| Number | Name | Date |
|---|---|---|
| 1,458,214 | McCauley | June 12, 1923 |
| 1,559,784 | Rowe | Nov. 3, 1925 |
| 2,318,260 | Sikorsky | May 4, 1943 |
| 2,396,618 | Stieglitz et al. | Mar. 12, 1946 |
| 2,500,811 | Forsyth | Mar. 14, 1950 |
| 2,613,751 | Donovan et al. | Oct. 14, 1952 |

FOREIGN PATENTS

| Number | Country | Date |
|---|---|---|
| 671,248 | France | Aug. 31, 1929 |